United States Patent
Mizutani

(10) Patent No.: US 10,769,077 B2
(45) Date of Patent: Sep. 8, 2020

(54) INFORMATION PROCESSING APPARATUS AND INFORMATION PROCESSING SYSTEM

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Tomohiro Mizutani, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 49 days.

(21) Appl. No.: 16/079,849

(22) PCT Filed: Mar. 7, 2017

(86) PCT No.: PCT/JP2017/008966
§ 371 (c)(1),
(2) Date: Aug. 24, 2018

(87) PCT Pub. No.: WO2017/163852
PCT Pub. Date: Sep. 28, 2017

(65) Prior Publication Data
US 2019/0050349 A1  Feb. 14, 2019

(30) Foreign Application Priority Data
Mar. 24, 2016  (JP) .................. 2016-060697

(51) Int. Cl.
*G06F 12/14* (2006.01)
*G06F 21/60* (2013.01)
(Continued)

(52) U.S. Cl.
CPC .......... *G06F 12/1458* (2013.01); *G06F 12/14* (2013.01); *G06F 12/145* (2013.01);
(Continued)

(58) Field of Classification Search
CPC ...... G06F 12/1458; G06F 21/60; G06F 12/14; G06F 21/78; G06F 21/62; G06F 12/145
See application file for complete search history.

(56) References Cited

U.S. PATENT DOCUMENTS

| 6,202,176 B1 * | 3/2001 | Baldischweiler ... G06F 12/1425 714/38.13 |
| 2007/0124534 A1 * | 5/2007 | Iwata ...................... G06F 21/62 711/103 |
| 2014/0351460 A1 | 11/2014 | Tsuboi et al. |

FOREIGN PATENT DOCUMENTS

| JP | H02-037484 A | 2/1990 |
| JP | 2007-148644 A | 6/2007 |

(Continued)

OTHER PUBLICATIONS

Jun. 13, 2017 Search Report issued in International Patent Application No. PCT/JP2017/008966.

*Primary Examiner* — Tasnima Matin
(74) *Attorney, Agent, or Firm* — Oliff PLC

(57) ABSTRACT

An information processing apparatus that includes a memory that is configured to store written information and to store a writing program for writing information to the memory; and an electronic control unit that is configured to write information to the memory in accordance with the writing program stored in the memory, wherein: the memory stores a disabling program for disabling overwriting of the
(Continued)

information stored in the memory, the electronic control unit disables overwriting of the information stored in the memory in accordance with the disabling program stored in the memory for disablement when writing of the information executed by the electronic control unit is finished, the memory stores reference information to be referred to when the electronic control unit executes writing of information, and the electronic control unit overwrites the reference information stored in the memory with information that is unrelated to the reference information.

7 Claims, 13 Drawing Sheets

(51) Int. Cl.
  *G06F 21/62* (2013.01)
  *G06F 21/78* (2013.01)
(52) U.S. Cl.
  CPC .............. *G06F 21/60* (2013.01); *G06F 21/62* (2013.01); *G06F 21/78* (2013.01)

(56) References Cited

FOREIGN PATENT DOCUMENTS

| | | |
|---|---|---|
| JP | 2008-105627 A | 5/2008 |
| JP | 2012-188027 A | 10/2012 |
| JP | 2012-256386 A | 12/2012 |
| JP | 2014-230140 A | 12/2014 |
| JP | 2015-022648 A | 2/2015 |

\* cited by examiner

INFORMATION PROCESSING APPARATUS AND INFORMATION PROCESSING SYSTEM

This application is the U.S. National Phase of PCT/JP2017/008966 filed Mar. 7, 2017, which claims priority to JP 2016-060697 filed Mar. 24, 2016, the entire disclosure of which is incorporated herein by reference.

BACKGROUND

The present disclosure relates to an information processing apparatus for processing information and an information processing system.

Conventionally, an information processing apparatus including a storage unit for writing, a writing unit, and an information storage unit is used.

The storage unit for writing stores a writing program for writing information to the information storage unit. The writing unit writes information to the information storage unit in accordance with the writing program. The information storage unit stores the written information.

Incidentally, JP 2012-188027A states that information stored in the information storage unit (referred to as "control program" stored in a "nonvolatile memory" in this text) is overwritten (referred to as "rewritten" in this text) with new information in accordance with a writing program stored in the storage unit for writing (referred to as "nonvolatile memory rewriting execution program" stored in a "nonvolatile memory" in this text).

SUMMARY

However, there is a problem in that, after writing of proper information to the information storage unit is finished, the information may be improperly overwritten.

An exemplary aspect of the disclosure provides an information processing apparatus and an information processing system with which improper overwriting of information can be prevented.

An information processing apparatus according to an embodiment of the present disclosure includes: a memory that is configured to store written information and to store a writing program for writing information to the memory; and an electronic control unit that is configured to write information to the memory in accordance with the writing program stored in the memory, wherein: the memory stores a disabling program for disabling overwriting of the information stored in the memory, the electronic control unit disables overwriting of the information stored in the memory in accordance with the disabling program stored in the memory for disablement when writing of the information executed by the electronic control unit is finished, the memory stores reference information to be referred to when the electronic control unit executes writing of information, and the electronic control unit overwrites the reference information stored in the memory with information that is unrelated to the reference information.

In the information processing apparatus according to the embodiment of the present disclosure, the electronic control unit overwrites the writing program with information that is unrelated to the writing program.

In the information processing apparatus according to the embodiment of the present disclosure, the electronic control unit automatically disables overwriting of the stored information when writing of information executed by the electronic control unit is finished.

The information processing apparatus according to the embodiment of the present disclosure further includes: a communicator that is configured to: send out the stored information or production information produced based on the stored information to an outside when writing of information executed by the electronic control unit is finished; and receive a disablement instruction for disabling overwriting of the stored information after the communicator has sent the stored information or the production information, wherein the electronic control unit disables overwriting of the stored information when the communicator receives the disablement instruction.

In the information processing apparatus according to the embodiment of the present disclosure, communication between a plurality of control apparatuses that control the electric apparatus is relayed.

An information processing system according to the embodiment of the present disclosure includes: an information processing apparatus that processes received information; and an information communication apparatus that sends information to the information processing apparatus, wherein the information processing apparatus includes: a memory that is configured to store written information and to store a writing program for writing information to the memory; and an electronic control unit that is configured to write information to the memory in accordance with the writing program stored in the memory, wherein: the memory stores a disabling program for disabling overwriting of the information stored in the memory, the electronic control unit disables overwriting of the information stored in the memory in accordance with the disabling program stored in the memory for disablement when writing of the information executed by the electronic control unit is finished, the memory stores reference information to be referred to when the electronic control unit executes writing of information, and the electronic control unit overwrites the reference information stored in the memory with information that is unrelated to the reference information.

In the information processing system according to the embodiment of the present disclosure, the information processing apparatus further includes a communicator that is configured to: send out the stored information or production information produced based on the stored information to the information communication apparatus when writing of information executed by the electronic control unit is finished; and receive a disablement instruction for disabling overwriting of the stored information after the communicator has sent the stored information or the production information, the information communication apparatus includes: a second communicator that is configured to receive the stored information or the production information; and a second electronic control unit that is configured to determine whether or not overwriting of the stored information is disabled based on the stored information or the production information received by the second communicator when the second communicator receives the stored information or the production information, wherein: the second communicator sends the disablement instruction to the information processing apparatus when the second electronic control unit determines that disablement is executed, and the first electronic control unit disables overwriting of the stored information when the communicator receives the disablement instruction.

In embodiments of the present disclosure, when writing of information to the memory is finished, overwriting of the information stored in the memory is disabled in accordance with the disabling program. The disabling program is stored in the memory.

In embodiments of the present disclosure, when writing of information to the memory is finished, the writing program itself is overwritten with information that is unrelated to the writing program.

Therefore, improper overwriting of the information due to writing of improper information to the memory, which stores the information, in accordance with the writing program can be prevented.

In embodiments of the present disclosure, when the electronic control unit writes information to the memory, the reference information is referred to. When writing of the information to the memory is finished, the reference information is overwritten with information that is unrelated to the reference information.

Therefore, improper overwriting of the information due to writing of improper information to the memory, which stores the information, with reference to the reference information can be prevented.

In embodiments of the present disclosure, when writing of information to the memory is finished, overwriting of the information stored in the memory is automatically disabled.

Therefore, improper overwriting of the information stored in the memory can be reliably prevented.

In embodiments of the present disclosure, when writing of information to the memory is finished, and the disablement instruction is received after the information stored in the memory or the production information is sent to the outside, overwriting of the information stored in the memory is disabled.

On the other hand, if the disablement instruction is not received, or if the disablement instruction is received though the information stored in the memory or the production information is not sent to the outside, overwriting of the information is not disabled.

Therefore, improper overwriting of the information and unnecessary disablement of the overwriting of the information can be prevented simultaneously.

In embodiments of the present disclosure, the information processing apparatus can be used as an in-vehicle communication relay apparatus that relays communication between in-vehicle control apparatuses, for example.

In embodiments of the present disclosure, when writing of the information received by the information processing apparatus to the memory is finished, overwriting of the information stored in the memory is disabled in accordance with the disabling program. The disabling program is stored in the memory for disablement.

In embodiments of the present disclosure, when writing of the information to the memory is finished, and the information processing apparatus receives the disablement instruction after the information stored in the memory or the production information is sent from the information processing apparatus to the information communication apparatus, overwriting of the information stored in the memory is disabled.

On the other hand, if the information processing apparatus does not receive the disablement instruction, or if the information processing apparatus receives the disablement instruction though the information stored in the memory or the production information is not sent from the information processing apparatus to the information communication apparatus, overwriting of the information is not disabled.

Therefore, improper overwriting of the information and unnecessary disablement of the overwriting of the information can be prevented simultaneously.

Incidentally, the information communication apparatus determines whether or not overwriting of the information stored in the memory is disabled, based on the content that is sent from the information processing apparatus and received by the information communication apparatus.

When overwriting is disabled, the information communication apparatus sends the disablement instruction to the information processing apparatus. On the other hand, if overwriting is not disabled, the disablement instruction is not sent.

Therefore, when overwriting of the information is not needed, overwriting can be disabled. On the other hand, when overwriting of the information is needed, overwriting can be enabled.

With the information processing apparatus and the information processing system of the embodiment of the present disclosure, overwriting of the information stored in the memory is disabled in accordance with the disabling program stored in the memory for disablement. Therefore, improper overwriting of the information stored in the memory can be prevented.

DETAILED DESCRIPTION OF EMBODIMENTS

Hereinafter, the present disclosure will be described in detail based on the diagrams showing its embodiments.

Embodiment 1

Figure 1:
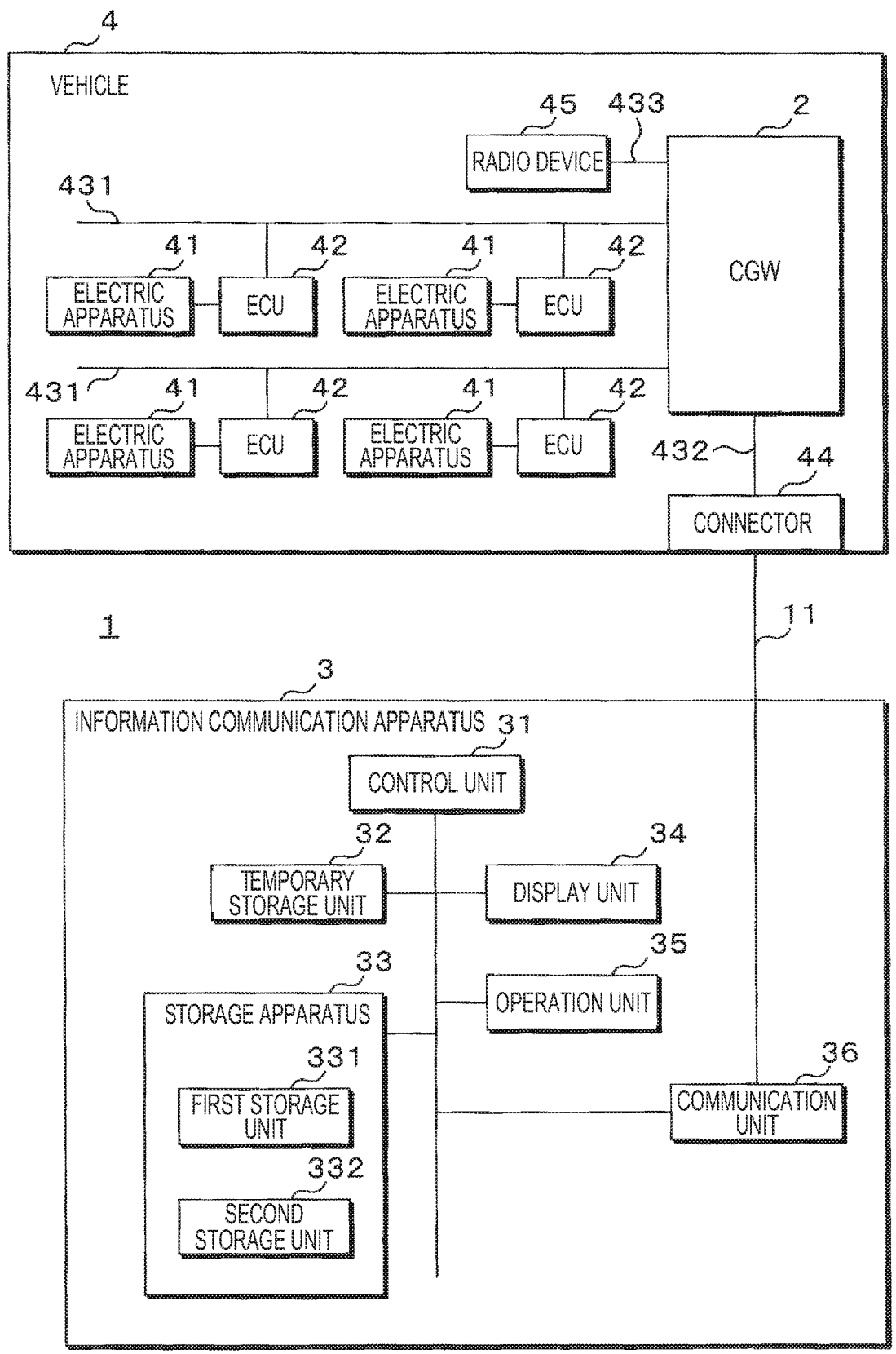
FIG. 1 is a block diagram schematically illustrating the configuration of an information processing system according to Embodiment 1.

FIG. 1 is a block diagram schematically illustrating the configuration of an information processing system according to Embodiment 1.

In this figure, 1 denotes an information processing system, which includes a CGW (central gateway) 2 that functions as an information processing apparatus according to Embodiment 1, and an information communication apparatus 3.

The CGW 2 is a communication relay apparatus mounted in a vehicle 4.

A plurality of electric apparatuses 41 and a plurality of ECUs 42 are mounted in the vehicle 4.

Examples of the electric apparatuses 41 include an illumination device and a car navigation device. The electric apparatuses 41 are connected to the respective ECUs 42.

Each ECU 42 is a control apparatus that has a function of controlling the operation of the electric apparatus 41 connected to the ECU 42, and a communication function. Each ECU 42 is connected to a bus 431. A plurality of ECUs 42 are connected to each bus 431.

IDs (referred to as "reception IDs 4" hereinafter) that are added to pieces of information to be received by the ECUs 42 are given to the ECUs 42 in advance. When an ECU 42 sends information to another ECU 42, the ECU 42 outputs, to the bus 431, the information to which the reception ID 4 of the communication destination is added.

The ECUs 42 receive the information inputted to the bus 431. Next, the ECUs 42 determine whether or not the reception ID 4 added to the received information is their own respective reception ID 4. If the reception ID 4 added to the received information is different from their own reception IDs 4, the ECUs 42 discard the received information. As a result, the ECUs 42 can selectively receive pieces of information to which their own reception ID 4 is added.

A plurality of buses 431 are connected to the CGW 2.

A connector 44 is also connected to the CGW 2 via a bus 432. A communication cable 11 is detachably connected to the connector 44.

Furthermore, a radio device 45 is connected to the CGW 2 via a bus 433. The radio device 45 communicates with a radio communication device located outside the vehicle 4.

A relay table providing the association between each bus 431 and the reception IDs 4 of the ECUs 42 connected thereto is given to the CGW 2. The CGW 2 refers to the given relay table and relays the communication between the ECUs 42. Specifically, the CGW 2 receives information outputted to the bus 432. Next, the CGW 2 refers to the relay table based on the reception ID 4 added to the received information. Then, the CGW 2 outputs the received information to the bus 431 associated with the reception ID 4.

As a result, information can be sent and received by the ECUs 42 connected to the separate buses 431.

The information communication apparatus 3 includes a control unit 31, a temporary storage unit 32 using a volatile memory, the storage apparatus 33 using a nonvolatile memory, a display unit 34, an operation unit 35, and a communication unit 36.

The control unit 31 includes a CPU. The control unit 31 is connected to the temporary storage unit 32, the storage apparatus 33, the display unit 34, the operation unit 35, and the communication unit 36 via buses.

The storage apparatus 33 stores information. The information stored in the storage apparatus 33 includes a computer program.

A part of the storage area of the storage apparatus 33 is constituted by a first storage unit 331. The first storage unit 331 stores computer programs for controlling the operations of the information communication apparatus 3. The control unit 31 uses the temporary storage unit 32 as a work area, and controls the operations of the units in the apparatus and executes various processes in accordance with the computer programs stored in the first storage unit 331.

Another part of the storage area of the storage apparatus 33 is constituted by a second storage unit 332. The second storage unit 332 stores information to be given to the CGW 2 (referred to as "given information" hereinafter). The following describes, as an example, a case where the given information is the relay table.

An example of the display unit 34 is a liquid crystal display panel.

Examples of the operation unit 35 include a keyboard and a touch panel.

The communication cable 11 is detachably connected to the communication unit 36.

Figure 2:
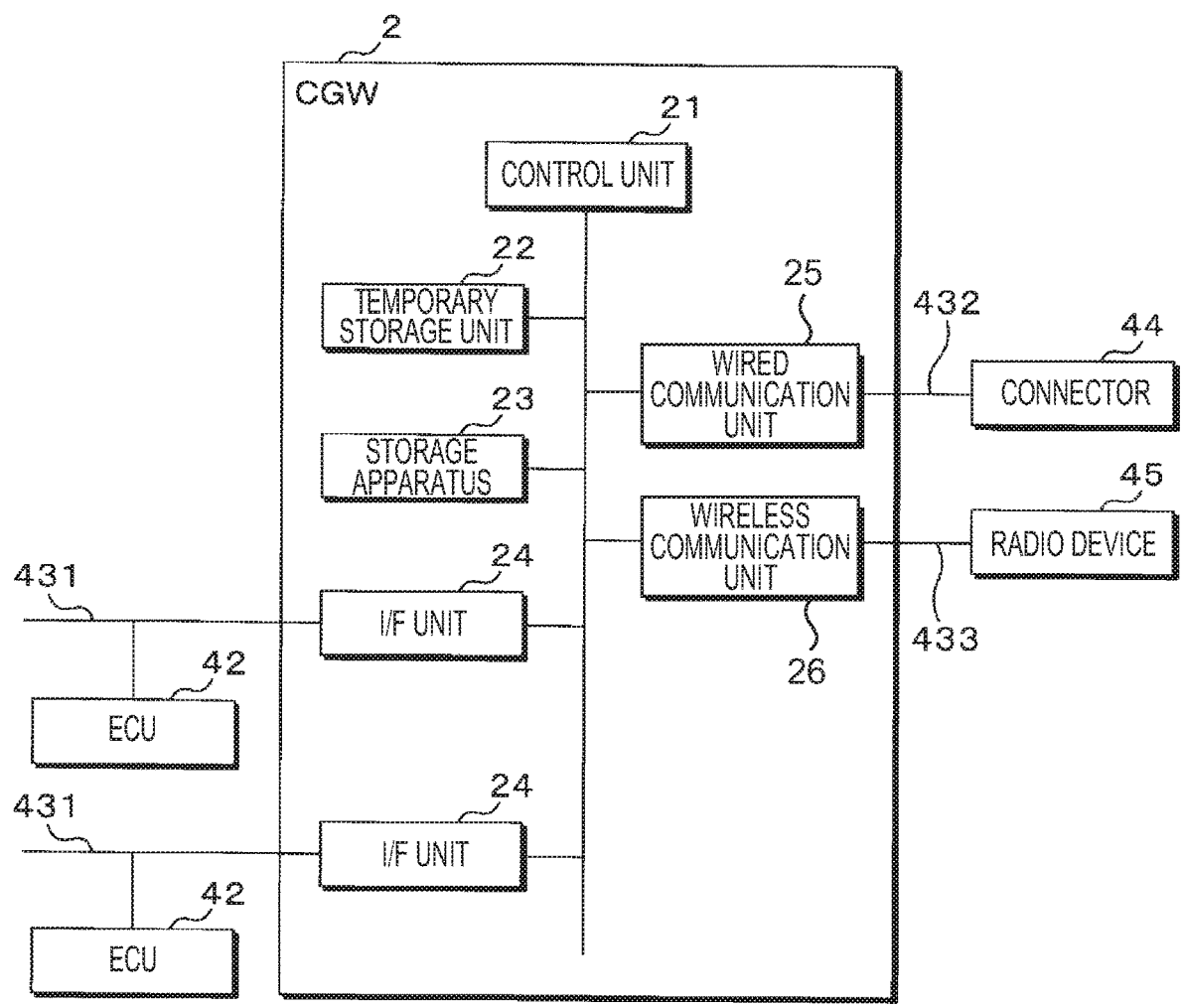
FIG. 2 is a block diagram schematically illustrating the configuration of a CGW (central gateway) that functions as an information processing apparatus according to Embodiment 1.

FIG. 2 is a block diagram schematically illustrating the configuration of the CGW 2.

The CGW 2 includes a control unit 21, a temporary storage unit 22 using a volatile memory, a storage apparatus 23 using a nonvolatile memory, a plurality of I/F (interface) units 24, a wired communication unit 25, and a wireless communication unit 26.

The control unit 21 includes a CPU. The control unit 21 is connected to the temporary storage unit 22, the storage apparatus 23, the I/F units 24, the wired communication unit 25, and the wireless communication unit 26 via buses.

The storage apparatus 23 stores information. The information stored in the storage apparatus 23 includes computer programs. The control unit 31 uses the temporary storage unit 22 as a work area, and controls the operations of the units in the apparatus and executes various processes in accordance with the computer programs stored in the storage apparatus 23.

A bus 431 is connected to each of the I/F units 24.

The connector 44 is connected to the wired communication unit 25 via the bus 432.

The radio device 45 is connected to the wireless communication unit 26 via the bus 433.

An ID (referred to as "reception ID 2" hereinafter) that is added to information to be received by the CGW 2 is given to the CGW 2 in advance.

Figure 3:
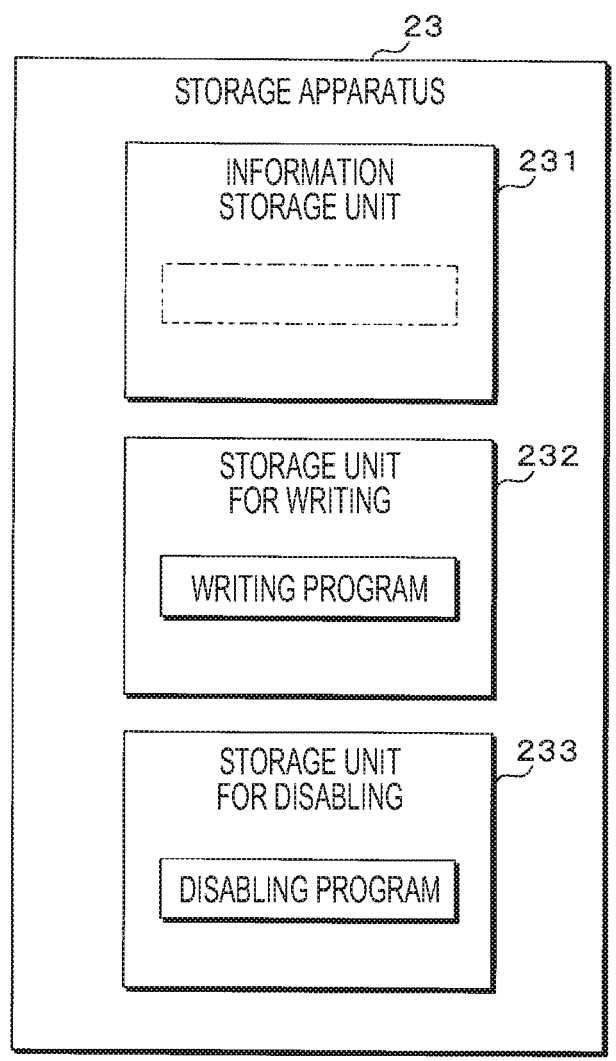
FIG. 3 is a schematic diagram illustrating examples of information stored in a storage apparatus provided in the CGW.

FIG. 3 is a schematic diagram illustrating examples of information stored in the storage apparatus 23.

A part of the storage area of the storage apparatus 23 is constituted by an information storage unit 231. The information storage unit 231 shown in FIG. 3 stores no information. From FIG. 3 onward, storing no information is represented by a long-double-short-dashed rectangle.

Another part of the storage area of the storage apparatus 23 is constituted by a storage unit 232 for writing. The storage unit 232 for writing stores a writing program for writing a control program to the information storage unit 231.

Yet another part of the storage area of the storage apparatus 23 is constituted by a storage unit 233 for disablement.

The storage unit 233 for disablement stores a disabling program for disabling overwriting of the information stored in the information storage unit 231.

Figure 4:
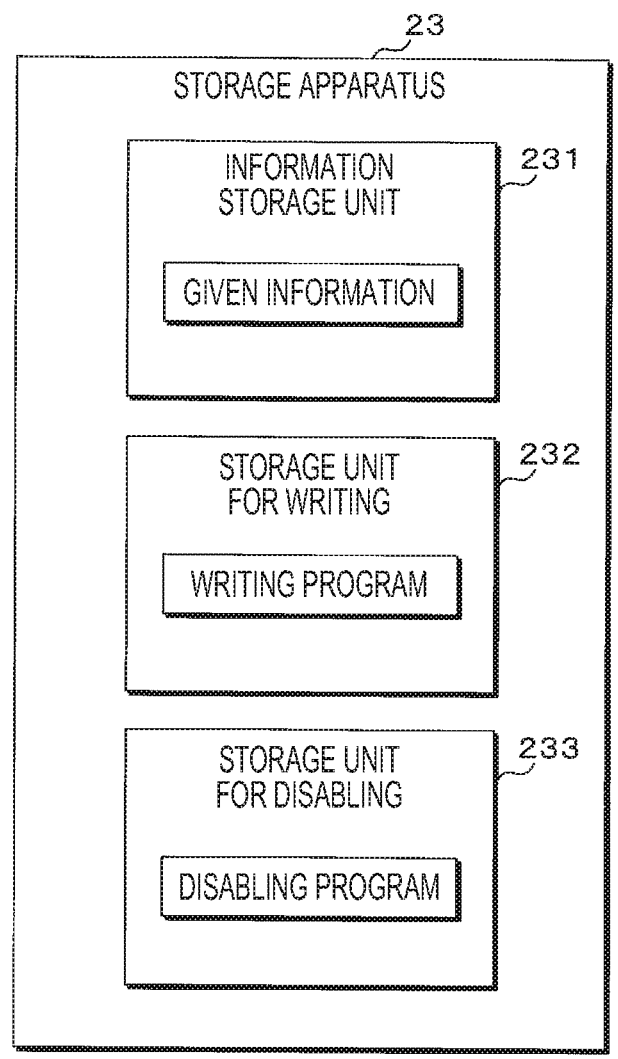
FIG. 4 is a schematic diagram illustrating other examples of information stored in the storage apparatus provided in the CGW.

FIG. 4 is a schematic diagram illustrating other examples of information stored in the storage apparatus 23.

The information storage unit 231 stores the given information.

The storage unit 232 for writing stores the writing program.

The storage unit 233 for disablement stores the disabling program.

Figure 5:
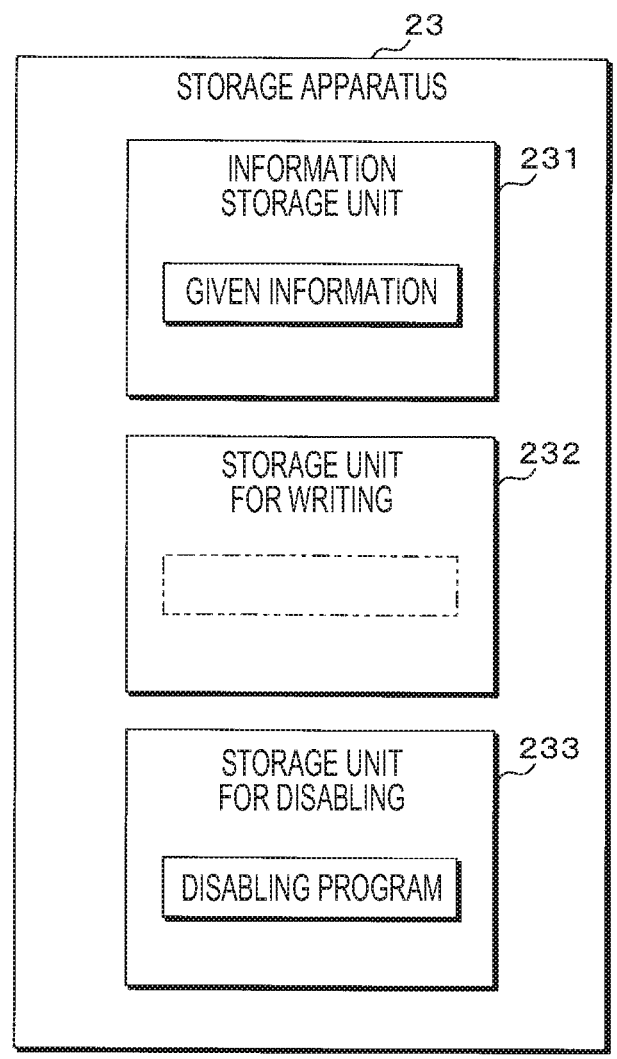
FIG. 5 is a schematic diagram illustrating yet other examples of information stored in the storage apparatus provided in the CGW.

FIG. 5 is a schematic diagram illustrating yet other examples of information stored in the storage apparatus 23.

The information storage unit 231 stores the given information.

The storage unit 232 for writing does not store the writing program.

The storage unit 233 for disablement stores the disabling program.

The CGW 2 is shipped from a CGW maker to a vehicle maker in a state in which the information storage unit 231 does not store the given information (see FIG. 3).

The vehicle maker assembles the CGW 2 to the vehicle 4. Thereafter, the given information is given to the CGW 2.

In order to give the CGW 2 the given information, an operator of the vehicle maker connects the communication unit 36 of the information communication apparatus 3 and the connector 44 of the vehicle 4 via the communication cable 11 (see FIG. 1).

Next, the operator operates the operation unit 35 of the information communication apparatus 3 and inputs, to the information communication apparatus 3, an instruction for writing the given information, and CGW identification information (e.g., the name of the CGW 2) for identifying the CGW 2 to which the given information is to be written.

Yet another part of the storage area of the storage apparatus 33 stores the CGW identification information for identifying the CGW 2 in association with the reception ID 2 of the CGW 2. The reception ID 2 of the CGW 2 to which the given information is to be given corresponds to the given information stored in the second storage unit 332.

When the writing instruction and the CGW identification information are inputted, the control unit 31 reads, from the second storage unit 332, the given information corresponding to the reception ID 2 associated with the CGW identification information, produces communication information including the readout given information, and outputs the produced communication information and the reception ID 2 to the communication unit 36.

The communication unit 36 adds the reception ID 2 to the inputted communication information, and sends the communication information.

The communication information sent by the communication unit 36 is inputted to the bus 432 via the communication cable 11.

The wired communication unit 25 of the CGW 2 receives the communication information inputted to the bus 432.

When the reception ID 2 of the CGW 2 is added to the received communication information, the wired communication unit 25 writes the received communication information to the temporary storage unit 22. When the reception ID 2 is not added to the received communication information, the wired communication unit 25 discards the received communication information.

Figure 6:
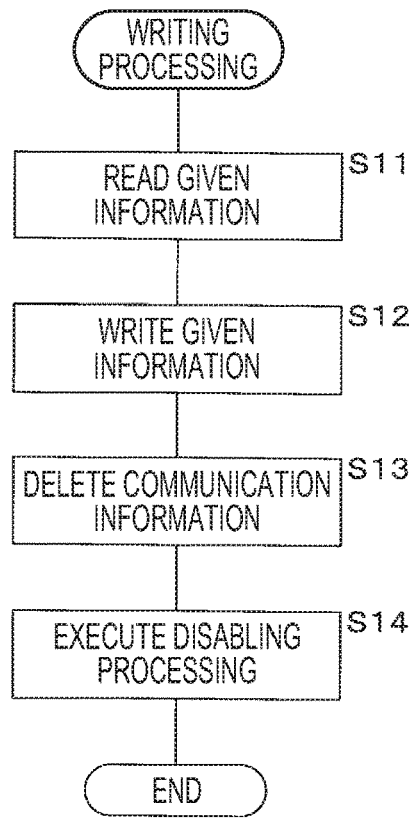
FIG. 6 is a flowchart illustrating a procedure of writing processing executed by the CGW.

FIG. 6 is a flowchart illustrating a procedure of writing processing executed by the CGW 2.

When the wired communication unit 25 writes the communication information including the given information to the temporary storage unit 22, the control unit 21 executes the writing processing in accordance with the writing program stored in the storage unit 232 for writing.

The control unit 21 reads the given information included in the communication information from the temporary storage unit 22 (S11), and writes the readout given information to the information storage unit 231 (S12). The control unit 21, which executes the processing in S12, functions as the writing unit of this embodiment.

After writing of the given information is finished, the control unit 21 deletes the communication information including the given information from the temporary storage unit 22 (S13).

After the processing in S12 is executed, the information storage unit 231 stores the given information (see FIG. 4).

However, the writing program stored in the storage unit 232 for writing can be used to overwrite the given information stored in the information storage unit 231 with information other than the given information (e.g., improper given information or meaningless information).

To address this, after the processing in S12 is finished, the control unit 21 executes disabling processing for disabling overwriting of the given information stored in the information storage unit 231 in accordance with the disabling program stored in the storage unit 233 for disablement (S14), and finishes the writing processing.

Figure 7:
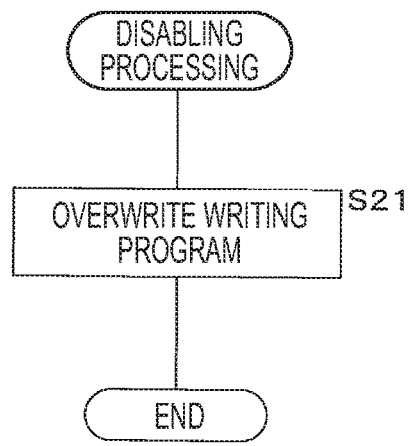
FIG. 7 is a flowchart illustrating a procedure of disabling processing executed by the CGW.

FIG. 7 is a flowchart illustrating a procedure of disabling processing executed by the CGW 2.

The control unit 21 overwrites the writing program stored in the storage unit 232 for writing with information that is unrelated to the writing program (e.g., meaningless information) (S21), and finishes the disabling processing. The control unit 21, which executes the processing in S21, functions as the disabling unit of this embodiment.

With the processing in S21, information that is unrelated to the writing program is written to all the clusters in the storage unit 232 for writing, for example. After the processing in S21 is executed, the storage unit 232 for writing does not store the writing program (see FIG. 5) anymore.

After the disabling processing is finished, the control unit 21 relays the communication between the ECUs 42 while referring to the given information (i.e., relay table) stored in the information storage unit 231. When the reception ID 4 of the ECU 42 is added to the communication information received by the wired communication unit 25, the control unit 21 outputs the communication information received by the wired communication unit 25 to the bus 431 corresponding to the reception ID 4.

After the given information is given to the CGW 2, the operator removes the communication cable 11 from the connector 44 and thus disconnects the communication unit 36 from the connector.

It should be noted that there is no limitation to the case that the information communication apparatus 3 gives the given information. For example, a server connected to the radio communication device may give the communication information including the given information.

The radio device 45 outputs, to the bus 433, the communication information received from the radio communication device. The wireless communication unit 26 of the CGW 2 receives the communication information inputted to the bus 433. When the reception ID 2 of the CGW 2 is added to the received communication information, the wireless communication unit 26 writes the received communication information to the temporary storage unit 22. When the wireless communication unit 26 writes the communication information including the given information to the temporary storage unit 22, the control unit 21 executes the writing processing in accordance with the writing program stored in the storage unit 232 for writing. On the other hand, when the reception ID 2 is not added to the received communication information, the wireless communication unit 26 discards the received communication information.

When the reception ID 4 of the ECU 42 is added to the communication information received by the wireless communication unit 26 after the disabling processing is finished, the control unit 21 outputs the communication information received by the wireless communication unit 26 to the bus 431 corresponding to the reception ID 4.

With the CGW 2 as described above, improper overwriting of the given information can be prevented.

The CGW maker gives the CGW 2 the writing program and the disabling program prior to the shipping of the CGW 2. Therefore, the vehicle maker need not prepare the writing program and the disabling program and give them to the CGW 2.

In addition, when the processing in S12 shown in FIG. 6 is finished, the disabling processing is automatically executed in S14. Therefore, an operator of the vehicle maker need not manually delete the writing program.

It should be noted that an example of the disabling processing may also be a set of flags for changing information (e.g, a file name) used to manage the writing program or moving the writing program to a storage area other than the storage unit 232 for writing, or prohibiting writing to the information storage unit 231. However, overwriting the writing program as in this embodiment is safer. The reason for this is that the writing program then is not present in the CGW 2 anymore.

In this embodiment, the relay table is shown as an example of the given information, but there is no limitation thereto.

For example, the given information may also be a cypher key that is used when any apparatus having a communication function communicates with the CGW 2. In this case, the storage unit 232 for writing stores a writing program for writing a cypher key to the information storage unit 231.

Alternatively, the given information may also be a computer program for relaying communication. In this case, after the disabling processing is finished, the control unit 21 relays the communication between the ECUs 42 in accordance with the computer program for relaying communication that is stored in the information storage unit 231.

The relay table, the cypher key, and the computer program for relaying communication are information that is directly used in the CGW 2, but the given information is not limited thereto. For example, the given information may also be the manufacturer's serial number of the vehicle 4.

Next, Embodiments 2 and 3 will be described. Information processing systems 1 of Embodiments 2 and 3 have substantially the same configuration as that of the information processing system 1 of Embodiment 1. Hereinafter, differences from Embodiment 1 will be described. In addition, components corresponding to those of Embodiment 1 are denoted by identical reference numerals, and further description thereof is omitted.

Embodiment 2

An ID (referred to as "reception ID 3" hereinafter) that is added to information to be received by the information communication apparatus 3 is given to the information communication apparatus 3 in advance.

When the writing instruction and the CGW identification information are inputted, the control unit 31 reads, from the second storage unit 332, the given information corresponding to the reception ID 2 associated with the CGW identification information, produces communication information including the readout given information and the reception ID 3, and outputs the produced communication information and the reception ID 2 to the communication unit 36.

The communication unit 36 adds the reception ID 2 to the inputted communication information, and sends the communication information.

When the reception ID 2 of the CGW 2 is added to the received communication information, the wired communication unit 25 writes the received communication information to the temporary storage unit 22. As a result, the wired communication unit 25 writes the communication information including the given information and the reception ID 3 to the temporary storage unit 22.

When the wired communication unit 25 writes the communication information including the given information and the reception ID 3 to the temporary storage unit 22, the control unit 21 executes writing processing in accordance with the writing program stored in the storage unit 232 for writing.

Figure 8:
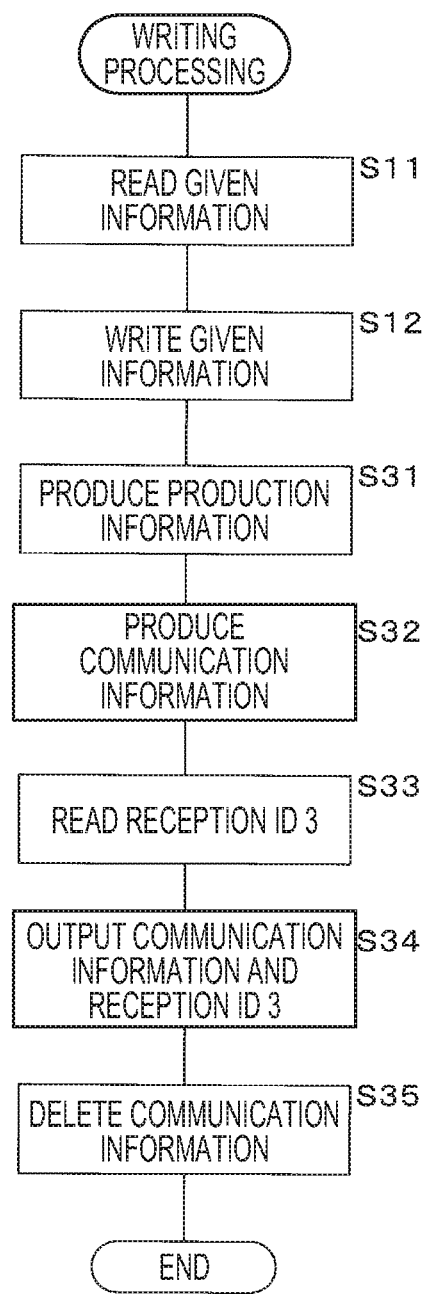
FIG. 8 is a flowchart illustrating a procedure of writing processing executed by a CGW that functions as an information processing apparatus according to Embodiment 2.

FIG. 8 is a flowchart illustrating a procedure of writing processing executed by the CGW 2 according to Embodiment 2.

The writing processing shown in FIG. 8 corresponds to writing processing including S31 to S35 described below instead of S13 and S14 in the writing processing shown in FIG. 6.

As shown in FIG. 8, after the processing in S12 is finished, the control unit 21 of the CGW 2 produces production information in accordance with a predetermined procedure based on information included in the given information stored in the information storage unit 231 (S31). An example of the production information produced in the processing in S31 is a hash value.

Next, the control unit 21 produces communication information including the production information produced in the processing in S31 and the reception ID 2 (S32). Furthermore, the control unit 21 reads the reception ID 3 included in the communication information from the temporary storage unit 22 (S33). Next, the control unit 21 outputs, to the wired communication unit 25, the communication information produced in the processing in S32 and the reception ID 3 read out in the processing in S33 (S34).

After the processing in S34 is finished, the control unit 21 deletes the given information and the communication information including the reception ID 3 from the temporary storage unit 22 (S35), and finishes the writing processing.

The wired communication unit 25 adds the reception ID 3 to the inputted communication information, and sends the communication information. At this time, the wired communication unit 25 functions as a finish sending unit/communicator of this embodiment.

The communication information sent by the wired communication unit 25 as a result of the processing in S34 is received by the communication unit 36 of the information communication apparatus 3.

When the reception ID 3 is added to the received communication information, the communication unit 36 writes the received communication information to the temporary storage unit 32. At this time, the received communication information includes the production information, and therefore, the communication unit 36 functions as an information receiving unit/second communicator of this embodiment. When the reception ID 3 is not added to the received communication information, the communication unit 36 discards the received communication information.

Figure 9:
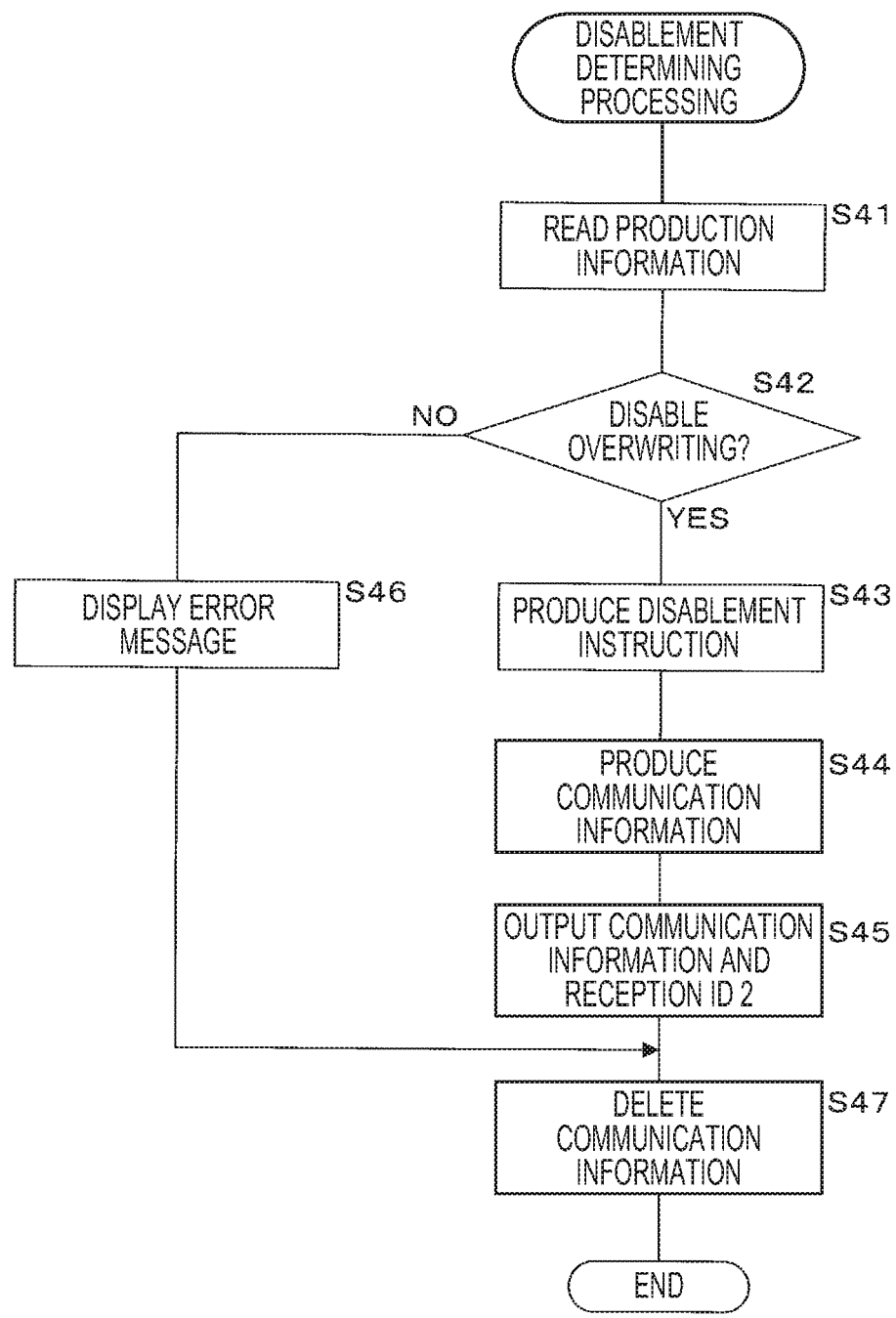
FIG. 9 is a flowchart illustrating a procedure of disablement determining processing executed by an information communication apparatus provided in an information processing system according to Embodiment 2.

FIG. 9 is a flowchart illustrating a procedure of disablement determining processing executed by the information communication apparatus 3 provided in the information processing system 1 according to Embodiment 2.

When the communication unit 36 writes the communication information including the production information to the temporary storage unit 32, the control unit 31 executes the disablement determining processing in accordance with a computer program stored in the first storage unit 331.

The control unit 31 reads the production information included in the communication information from the temporary storage unit 32 (S41), and determines whether or not overwriting of the given information stored in the information storage unit 231 of the CGW2 is disabled, based on the readout production information (S42). The control unit 31, which executes the processing in S42, functions as a disablement determining unit of this embodiment.

In order to execute the processing in S42, the control unit 31 produces the production information in advance in accordance with a predetermined procedure based on information included in the given information stored in the second storage unit 332. The produced production information corresponds to the reception ID 2. In the processing in S42, the control unit 31 reads the reception ID 2 included in the communication information from the temporary storage unit 32, and compares the production information corresponding to the readout ID 2 with the production information read out in the processing in S41.

When the compared pieces of production information are identical, the control unit 31 determines that overwriting of the given information is disabled (YES in S42).

In the case of YES in S42, the control unit 31 produces a disablement instruction for ordering that overwriting of the given information stored in the information storage unit 231 is disabled (S43), and produces communication information including the produced disablement instruction (S44). Next, the control unit 31 outputs the produced communication information and the reception ID 2 to the communication unit 36 (S45).

The communication unit 36 adds the reception ID 2 to the inputted communication information, and sends the communication information. At this time, the communication unit 36 functions as a disablement sending unit/second communicator of this embodiment.

When the compared pieces of production information are not identical, the control unit 31 determines that overwriting of the given information is not disabled (NO in S42).

In the case of NO in S42, the control unit 31 causes the display unit 34 to display an error message indicating that a given information writing error occurs in the CGW 2 (S46).

After the processing in S45 or S46 is finished, the control unit 31 deletes the communication information including the production information from the temporary storage unit 32 (S47), and finishes the disablement determining processing.

An operator who has visually confirmed the error message removes the cause of the given information writing error. Thereafter, the operator operates the operation unit 35 again, and inputs the writing instruction and the CGW identification information to the information communication apparatus 3.

The communication information sent by the communication unit 36 as a result of the processing in S45 is received by the wired communication unit 25 of the CGW 2.

When the reception ID 2 of the CGW 2 is added to the received communication information, the wired communication unit 25 writes the received communication information to the temporary storage unit 22. At this time, the received communication information includes the disablement instruction, and therefore, the communication unit 25 functions as an instruction receiving unit/communicator of this embodiment.

When the wired communication unit 25 writes the communication information including the disablement instruction to the temporary storage unit 22, the control unit 21 of the CGW 2 executes the disabling processing shown in FIG. 7. As a result, improper overwriting of the given information can be prevented.

When the disabling processing is not executed, the control unit 21 writes the given information included in the communication information to the information storage unit 231 whenever the wired communication unit 25 writes the communication information including the given information and the reception ID 3 to the temporary storage unit 22. Therefore, the given information that has failed to be written can be overwritten. In other words, when the given information needs to be overwritten, overwriting of the given information can be prevented from being disabled.

It should be noted that, after the processing in S12 is finished, the control unit 21 of the CGW 2 may also produce communication information including the given information stored in the information storage unit 231 and the reception ID 2 in the processing in S32 without executing the processing in S31.

In this case, in the processing in S41, the control unit 31 reads the given information included in the communication information from the temporary storage unit 32. In addition, in the processing in S42, when the given information included in the production information read out in the processing in S41 and the given information corresponding to the reception ID 2 included in the communication information are identical, the control unit 31 determines that overwriting of the given information is disabled.

When information written to the information storage unit 231 is a cypher key, production information produced in the processing in S31 may also be information obtained by enciphering predetermined information (e.g., the reception ID 2 of the CGW 2) based on the cypher key stored in the information storage unit 231.

In this case, in the processing in S42, when information obtained by deciphering the production information read out in the processing in S41 and the predetermined information are identical, the control unit 31 determines that overwriting of the given information is disabled.

The CGWs 2 of Embodiments 1 and 2 have a configuration in which overwriting of all pieces of given information written to the information storage unit 231 is disabled, but there is not limitation thereto. For example, the CGW 2 may also have a configuration in which overwriting of one piece of given information (e.g., cypher key) is disabled, while overwriting of another piece of given information (e.g., update of a computer program for relaying communication) is enabled.

To achieve this, the storage unit 232 for writing stores one writing program for writing one piece of given information to the information storage unit 231 and another writing program for writing another piece of given information to the information storage unit 231.

When one piece of given information is received and written to the information storage unit 231, the control unit 21 executes the disabling processing and disables one writing program stored in the storage unit 232 for writing.

On the other hand, when the other piece of given information is received and written to the information storage unit 231, the control unit 21 does not execute the disabling processing. At this time, the other writing program stored in the storage unit 232 for writing is not disabled.

As a result, even if one piece of given information is received again, writing to the information storage unit 231 is not executed because the one writing program is disabled. However, when the other piece of given information is received, writing to the information storage unit 231 is executed.

Alternatively, the writing programs stored in the storage unit 232 for writing include one subprogram for writing one piece of given information to the information storage unit 231 and the other subprogram for writing the other piece of given information to the information storage unit 231.

When one piece of given information is received and written to the information storage unit 231, the control unit 21 executes the disabling processing and disables one subprogram of the writing programs stored in the storage unit 232 for writing.

On the other hand, when the other piece of given information is received and written to the information storage unit 231, the control unit 21 does not execute the disabling processing. At this time, the other subprogram stored in the storage unit 232 for writing is not disabled.

As a result, even if one piece of given information is received again, writing to the information storage unit 231 is not executed because one subprogram is disabled. However, when the other piece of given information is received, writing to the information storage unit 231 is executed.

Embodiment 3

The following describes a configuration in which overwriting of first given information (information) is disabled, while overwriting of second given information is enabled. An example of the first given information is a cypher key, and an example of the second given information is a computer program for relaying communication. In the following description, when the first given information and the second given information are not distinguished, they are referred to merely as "given information".

Figure 10:
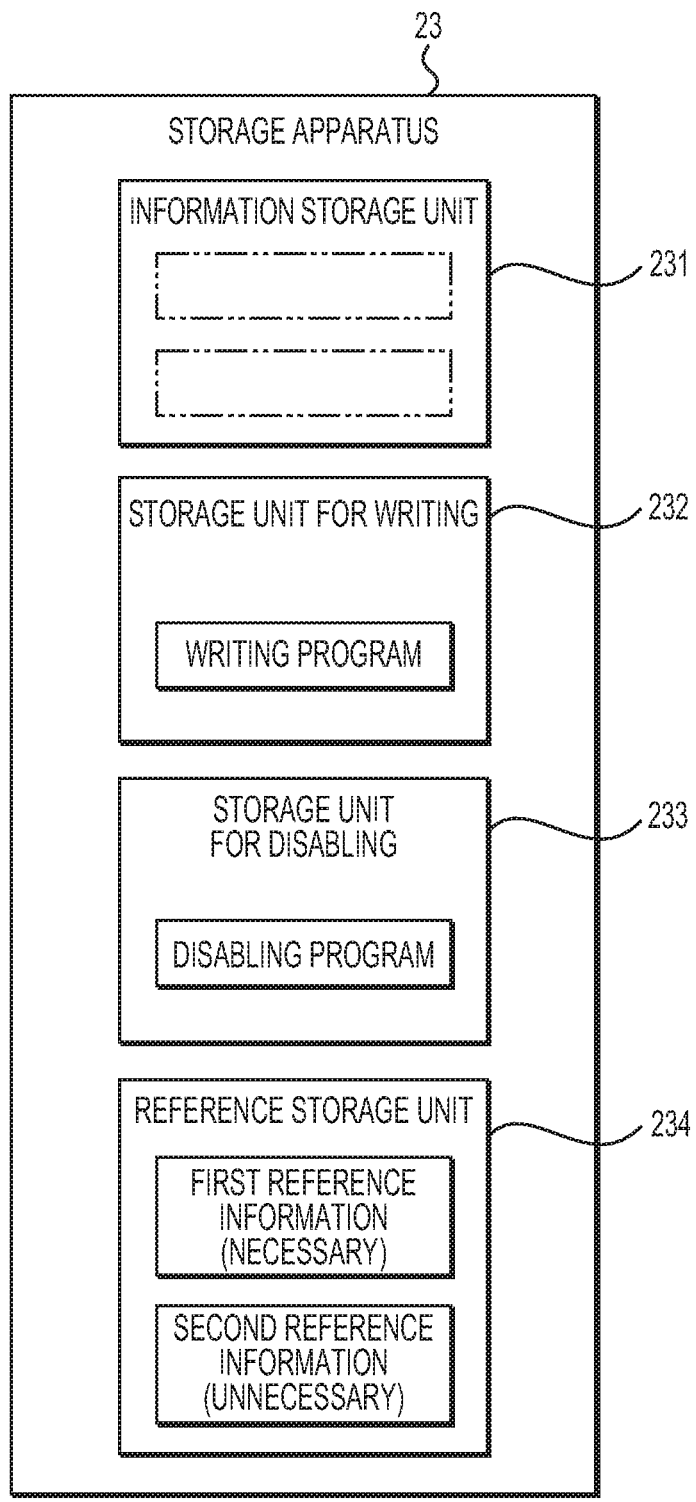
FIG. 10 is a schematic diagram illustrating examples of information stored in a storage apparatus provided in a CGW that functions as an information processing apparatus according to Embodiment 3.

FIG. 10 is a schematic diagram illustrating examples of information stored in the storage apparatus 23 provided in the CGW according to Embodiment 3.

The information storage unit 231 stores neither the first given information nor the second given information.

The storage unit 232 for writing stores a writing program. This writing program is used to write the given information to the information storage unite 231.

The storage unit 233 for disablement stores a disabling program.

Yet another part of the storage area of the storage apparatus 23 is a reference storage unit 234. The reference storage unit 234 stores first reference information and second reference information. In the following description, when the first reference information and the second reference information are not distinguished, they are referred to merely as "reference information". The reference information is referred to when the control unit 21 executes the writing processing for writing the given information to the information storage unit 231 in accordance with the writing program stored in the storage unit 232 for writing.

The first reference information is referred to when the first given information is written. In other words, the first given information cannot be written to the information storage unit 231 without referring to the first reference information. Specific examples of the first reference information include a function, a subroutine, a coefficient, and an address of a writing target. The first reference information is associated with necessity information ("(necessary)" in the diagram) indicating that the first reference information needs to be disabled after the first given information is written, and a reference ID 1 for identifying the first reference information.

The second reference information is substantially the same as the first reference information. However, the second reference information is referred to when the second given information is written. The second reference information is associated with necessity information ("(unnecessary)" in the diagram) indicating that the second reference information need not be disabled after the second given information is written, and a reference ID 2 for identifying the second reference information.

In the following description, when the reference ID 1 and the reference ID 2 are not distinguished, they are referred to merely as "reference ID".

Figure 11:
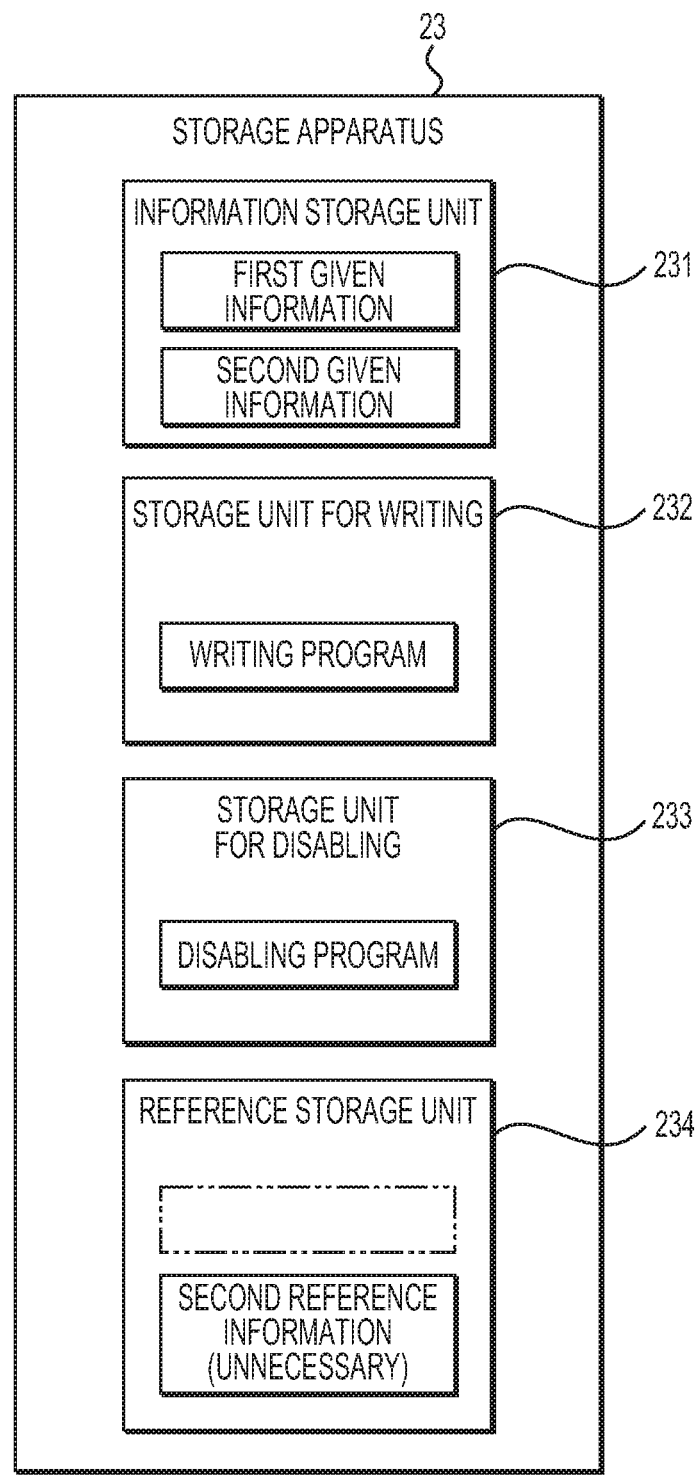
FIG. 11 is a schematic diagram illustrating other examples of information stored in the storage apparatus provided in the CGW.

FIG. 11 is a schematic diagram illustrating yet other examples of information stored in the storage apparatus 23.

The information storage unit 231 stores the first given information and the second given information.

The storage unit 232 for writing stores a writing program.

The storage unit 233 for disablement stores a disabling program.

The reference storage unit 234 does not store the first reference information, but stores the second reference information.

The CGW 2 is shipped from a CGW maker to a vehicle maker in a state in which the information storage unit 231 stores neither the first given information nor the second given information (see FIG. 10).

The vehicle maker assembles the CGW 2 to the vehicle 4. Thereafter, the given information is given to the CGW 2.

To address this, the second storage unit 332 of the information communication apparatus 3 stores given information. The reception ID 2 of the CGW 2 to which the given information is to be given, and the reference ID of the reference information to be referred to when the given information is written correspond to the given information stored in the second storage unit 332.

An operator of the vehicle maker connects the communication unit 36 of the information communication apparatus 3 and the connector 44 of the vehicle 4 via the communication cable 11 (see FIG. 1).

Next, the operator operates the operation unit 35 of the information communication apparatus 3 and inputs, to the information communication apparatus 3, instructions for writing the first given information and the second given information, and CGW identification information for identifying the CGW 2 to which the first given information and the second given information are to be written.

When the writing instructions and the CGW identification information are inputted, the control unit 31 reads, from the second storage unit 332, the first given information and second given information corresponding to the reception ID 2 associated with the CGW identification information, and the necessity information and reference IDs associated with the first given information and the second given information, produces communication information including the readout given information, necessity information, and reference IDs, and outputs the produced communication information and the reception ID 2 to the communication unit 36.

The communication unit 36 adds the reception ID 2 to the inputted communication information, and sends the communication information.

The wired communication unit 25 receives the communication information sent by the communication unit 36.

When the reception ID 2 of the CGW 2 is added to the received communication information, the wired communication unit 25 writes the received communication information to the temporary storage unit 22.

Figure 12:
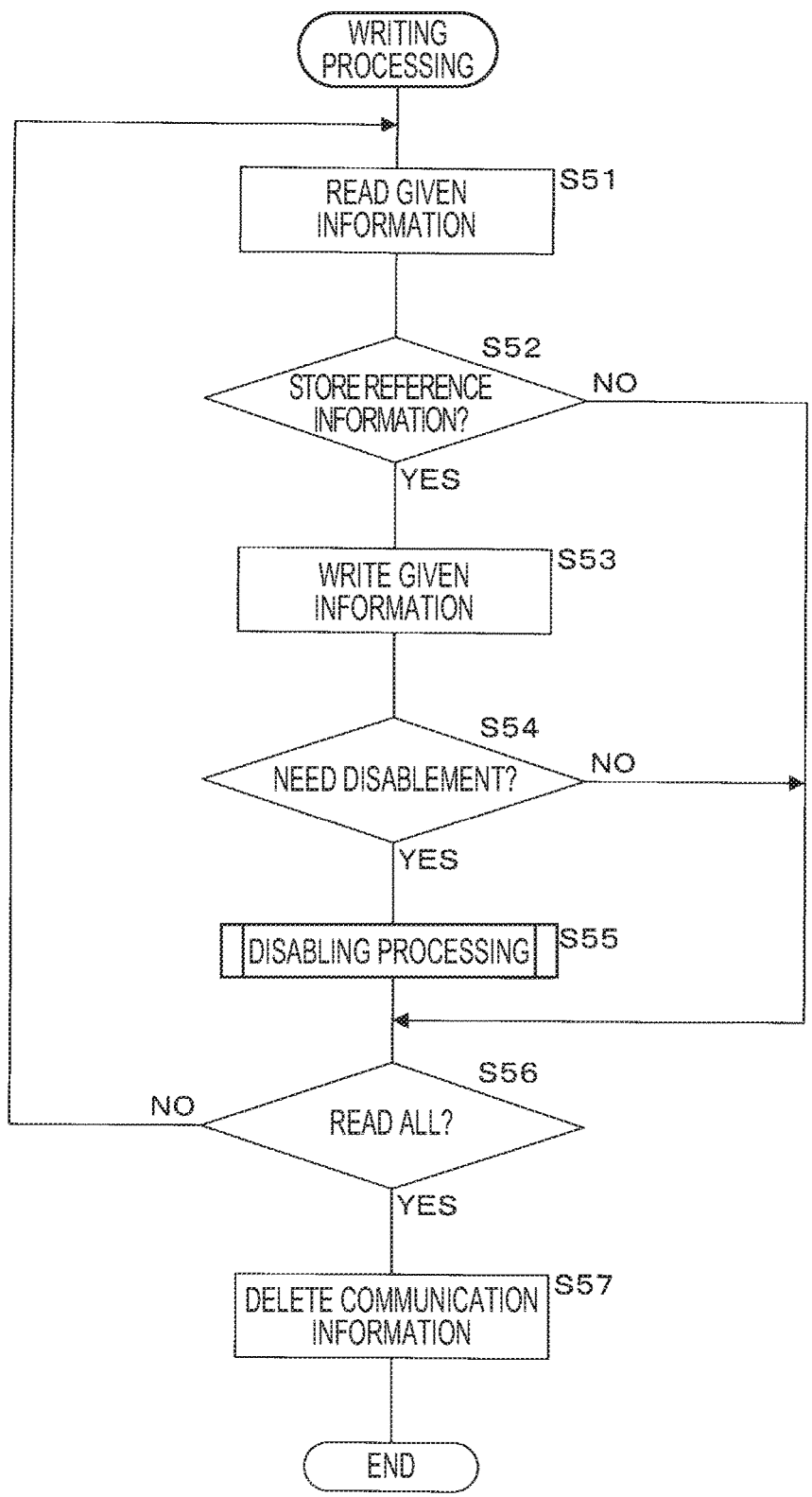
FIG. 12 is a flowchart illustrating a procedure of writing processing executed by the CGW.

FIG. 12 is a flowchart illustrating a procedure of writing processing executed by the CGW 2.

When the wired communication unit 25 writes, to the temporary storage unit 22, the communication information including the given information, the necessity information, and the reference IDs, the control unit 21 executes the writing processing in accordance with the writing program stored in the storage unit 232 for writing.

The control unit 21 reads, from the temporary storage unit 22, given information that is not read from the temporary storage unit 22 yet, out of pieces of given information included in the communication information, and the reference ID and necessity information associated with the given information (S51).

Next, the control unit 21 determines whether or not the reference storage unit 234 stores the reference information corresponding to the reference ID read out in S51 (S52). For example, when the reference ID read out in S51 is the reference ID 1, the control unit 21 determines whether or not the reference storage unit 234 stores the first reference information, which corresponds to the reference ID 1.

When the reference storage unit 234 stores the reference information (YES in S52), the control unit 21 refers to the reference information stored in the reference storage unit 234, and writes the given information read out in S51 to the information storage unit 231 (S53). The control unit 21, which executes the processing in S53, functions as the writing unit of this embodiment.

Next, the control unit 21 determines whether or not the necessity information read out in S51 indicates that the reference information needs to be disabled (S54). For example, when the reference ID read out in S51 is the reference ID 1, the necessity information read out in S51 indicates that the first reference information needs to be disabled after the first given information is written.

When the reference information needs to be disabled (YES in S54), the control unit 21 executes disabling processing (S55) (see FIG. 13, which will be described below).

Figure 13:
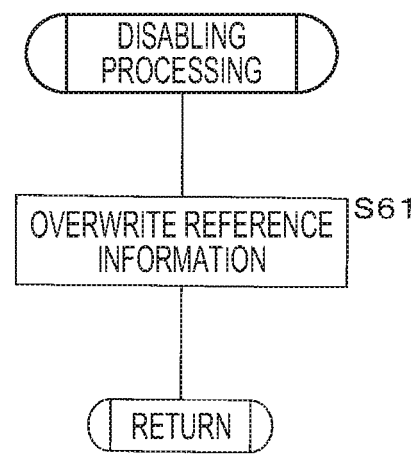
FIG. 13 is a flowchart illustrating the details of a procedure of disabling processing executed by the CGW.

FIG. 13 is a flowchart illustrating the details of a procedure of disabling processing executed by the CGW 2. The control unit 21 executes the disabling processing in accordance with the disabling program stored in the storage unit 233 for disablement.

The control unit 21 overwrites the reference information stored in the reference storage unit 234 with information that is unrelated to the reference information (S61). The control unit 21, which executes the processing in S61, functions as the disabling unit of this embodiment.

After the processing in S61 is finished, the control unit 21 finishes the disabling processing, and returns to the writing processing shown in FIG. 12.

After the processing in S55 is finished, the control unit 21 determines whether or not all pieces of given information included in the communication information have been read from the temporary storage unit 22 (S56), and when given information that has not been read from the temporary storage unit 22 yet is present (NO in S56), the processing returns to S51.

When all pieces of given information included in the communication information have been read from the temporary storage unit 22 (YES in S56), the control unit 21 deletes the communication information including the given information from the temporary storage unit 22 (S57), and finishes the writing processing.

When the reference storage unit 234 does not store the reference information (NO in S52), or the reference information need not be disabled (NO in S54), processing by the control unit 21 moves to S56.

As shown in FIG. 10, when the information storage unit 231 stores neither the first given information nor the second given information, and the communication information written to the temporary storage unit 22 includes both the first given information and the second given information, the processing in S53 is executed twice. After the processing in S53 is executed twice, the information storage unit 231 stores the first given information and the second given information.

When the first given information is written to the information storage unit 231 by the processing in S53, the processing in S55 is executed. On the other hand, the second given information is written to the information storage unit 231 by the processing in S53, the processing in S55 is not executed. As a result, the reference storage unit 234 does not store the first reference information, but stores the second reference information (see FIG. 11).

As shown in FIG. 11, when the information storage unit 231 stores the first given information and the second given information, and the communication information written to the temporary storage unit 22 includes the first given information, the determination in S52 is NO, and thus the processing in S53 is not executed. Therefore, improper overwriting of the first given information can be prevented.

As shown in FIG. 11, when the information storage unit 231 stores the first given information and the second given information, and the communication information written to the temporary storage unit 22 includes the second given information, the determination in S52 is YES, and thus the processing in S53 is executed. In addition, the determination in S54 is NO, and thus the processing in S55 is not executed. Therefore, the second given information may be updated.

It should be noted that an example of the disabling processing may also be a set of flags for changing information used to manage the reference information or moving the reference information to a storage area other than the reference storage unit 234, or prohibiting the reference to the reference information. However, overwriting the reference information as in this embodiment is safer.

When given information to be updated need not be given to the CGW 2, both the reference information and the writing program may be overwritten after the information storage unit 231 stores all pieces of given information.

In Embodiments 1 to 3, the cases where the information processing apparatus is the CGW 2 are shown as examples, but there is no limitation thereto. For example, the information processing apparatus may also be the ECU 42. When the information processing apparatus is the ECU 42, the given information is sent to the ECU 42 via the CGW 2.

In Embodiments 1 to 3, the configurations in which the writing program and the disabling program are separate from each other are shown as examples, but there is no limitation thereto. For example, the writing program may include the disabling program. The writing program including the disabling program is copied to the temporary storage unit 22 and then executed. The writing program stored in the temporary storage unit 22 is overwritten with information that is written to the temporary storage unit 22 after the disabling processing is finished.

In Embodiments 1 to 3, the cases where the given information is given to the CGW 2 mounted in the vehicle 4 are shown as examples, but there is no limitation thereto. The following describes, as an example, a case where the given information is given to the ECU 42 that is not mounted in the vehicle 4 yet. An example of the given information given to the ECU 42 is a control program for controlling the operation of the electric apparatus 41.

Embodiment 4

Figure 14:
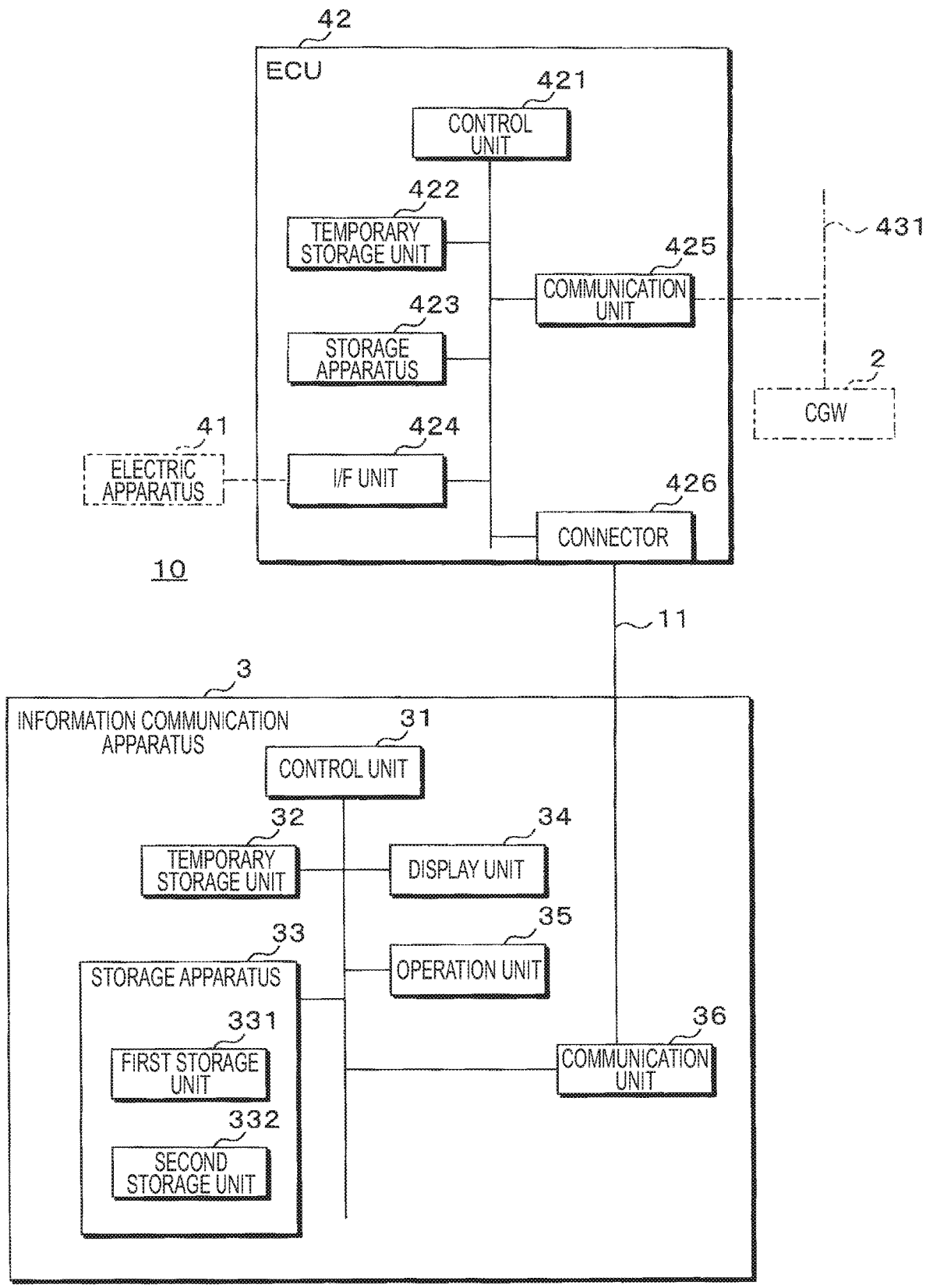
FIG. 14 is a block diagram schematically illustrating the configuration of an information processing system according to Embodiment 4.

FIG. 14 is a block diagram schematically illustrating the configuration of an information processing system according to Embodiment 4.

In this figure, 10 denotes an information processing system, and the information processing system 10 includes an ECU 42 that functions as an information processing apparatus according to Embodiment 4, and an information communication apparatus 3.

The ECU 42 includes a control unit 421, a temporary storage unit 422 using a volatile memory, a storage apparatus 423 using a nonvolatile memory, an I/F unit 424, a communication unit 425, and a connector 426.

The control unit 421 includes a CPU. The control unit 421 is connected to the temporary storage unit 422, the storage apparatus 423, the I/F unit 424, the communication unit 425, and the connector 426 via buses.

The storage apparatus 423 stores information. The information stored in the storage apparatus 423 includes computer programs. The control unit 421 uses the temporary storage unit 422 as a work area, and controls the operations of the units in the apparatus and executes various processes in accordance with the computer programs stored in the storage apparatus 423.

The information storage unit 231, the storage unit 232 for writing, and the storage unit 233 for disablement as shown in FIGS. 3 to 5 make up the storage area of the storage apparatus 423.

When the ECU 42 is mounted in the vehicle 4, the electric apparatus 41 is connected to the I/F unit 424.

When the ECU 42 is mounted in the vehicle 4, the communication unit 425 is connected to the bus 431.

The communication cable 11 is detachably connected to the connector 426.

The ECU 42 is shipped from an ECU maker to a vehicle maker in a state in which the information storage unit 231 does not store given information.

The vehicle maker gives the ECU 42 given information and then assembles the ECU 42 to the vehicle 4.

In order to give the ECU 42 the given information, an operator of the vehicle maker connects the communication unit 36 of the information communication apparatus 3 and the connector 426 of the ECU 42 via the communication cable 11.

Next, the operator operates the operation unit 35 of the information communication apparatus 3 and inputs, to the information communication apparatus 3, an instruction for writing the given information, and ECU identification information (e.g., the name of the ECU 42) for identifying the ECU 42 to which the given information is to be written.

A part of the storage area of the storage apparatus 33 stores the ECU identification information for identifying the ECU 42 in association with the reception ID 4 of the ECU 42. The reception ID 4 of the ECU 42 to which the given information is to be given corresponds to the given information stored in the second storage unit 332.

When the writing instruction and the ECU identification information are inputted, the control unit 31 reads, from the second storage unit 332, the given information corresponding to the reception ID 4 associated with the ECU identification information, produces communication information including the readout given information, and outputs the produced communication information and the reception ID 4 to the communication unit 36.

The communication unit 36 adds the reception ID 4 to the inputted communication information, and sends the communication information.

The communication information sent by the communication unit 36 is inputted to the connector 426 of the ECU 42 via the communication cable 11. The communication information inputted to the connector 426 is written to the temporary storage unit 422.

The control unit 421 of the ECU 42 determines whether or not the reception ID 4 of the ECU 42 is added to the communication information written to the temporary storage unit 422.

When the reception ID 4 of the ECU 42 is not added to the communication information written to the temporary storage unit 422, the communication unit 425 deletes the communication information written to the temporary storage unit 422 from the temporary storage unit 422.

When the reception ID 4 of the ECU 42 is added to the communication information written to the temporary storage unit 422, the control unit 421 executes writing processing as shown in FIG. 6 in accordance with a writing program stored in the storage unit 232 for writing.

After disabling processing is finished, the control unit 421 of the ECU 42 assembled to the vehicle 4 controls the operation of the electric apparatus 41 via the I/F unit 424 in accordance with the given information (i.e., the control program) stored in the information storage unit 231.

In Embodiment 4, a case where the information processing apparatus is the ECU 42 is shown as an example, but there is no limitation thereto. For example, the information processing apparatus may also be a CGW 2 that is not mounted in the vehicle 4 yet.

In Embodiments 1 to 4, cases where the information communication apparatus 3 gives the information processing apparatus the given information are shown as examples, but there is no limitation thereto. For example, the information processing apparatus may include an information inputting unit, and an operator may use the information inputting unit to give the information processing apparatus the given information.

The embodiments disclosed herein are exemplary in all respects, and should be construed as being not limitative. The scope of the present disclosure is intended to include all modifications within the scope and meaning equivalent to the claims rather than the meaning described above.

Furthermore, the information processing system 1 or the CGW 2 may include constituent elements that are not disclosed in Embodiments 1 to 3 as long as the present disclosure is effected.

The structural requirements (technical features) that are disclosed in the embodiments can be combined with each other, and the combinations can establish new technical features.

The invention claimed is:

1. An information processing apparatus comprising:
a memory that is configured to store written information and to store a writing program for writing information to the memory; and
an electronic control unit that is configured to write information to the memory in accordance with the writing program stored in the memory, wherein:
the memory stores a disabling program for disabling overwriting of the information stored in the memory,
the electronic control unit disables overwriting of the information stored in the memory in accordance with the disabling program stored in the memory for disablement when writing of the information executed by the electronic control unit is finished,
the memory stores reference information which is information to be referred to when the electronic control unit executes writing of information, and
the electronic control unit overwrites the reference information stored in the memory with information that is unrelated to the reference information.

2. The information processing apparatus according to claim 1, wherein the electronic control unit overwrites the writing program with information that is unrelated to the writing program.

3. The information processing apparatus according to claim 1, wherein the electronic control unit automatically disables overwriting of the stored information when writing of information executed by the electronic control unit is finished.

4. The information processing apparatus according to claim 1, further comprising:
a communicator that is configured to:
send out the stored information or production information produced based on the stored information to an outside when writing of information executed by the electronic control unit is finished; and
receive a disablement instruction for disabling overwriting of the stored information after the communicator has sent the stored information or the production information,
wherein the electronic control unit disables overwriting of the stored information when the communicator receives the disablement instruction.

5. The information processing apparatus according to claim 1, wherein communication between a plurality of outside electronic control apparatuses that control the electronic control apparatus is relayed.

6. An information processing system comprising:
an information processing apparatus that processes received information; and
an information communication apparatus that sends information to the information processing apparatus,
wherein the information processing apparatus includes:
a writing program for writing information to the memory; and
an electronic control unit that is configured to write information to the memory in accordance with the writing program stored in the memory, wherein:
the memory stores a disabling program for disabling overwriting of the information stored in the memory,
the electronic control unit disables overwriting of the information stored in the memory in accordance with the disabling program stored in the memory for disablement when writing of the information executed by the electronic control unit is finished,
the memory stores reference information which is information to be referred to when the electronic control unit executes writing of information, and
the electronic control unit overwrites the reference information stored in the memory with information that is unrelated to the reference information.

7. The information processing system according to claim 6,
wherein the information processing apparatus further includes a communicator that is configured to:
send out the stored information or production information produced based on the stored information to the information communication apparatus when writing of information executed by the electronic control unit is finished; and
receive a disablement instruction for disabling overwriting of the stored information after the communicator has sent the stored information or the production information,
the information communication apparatus includes:
a second communicator that is configured to receive the stored information or the production information; and
a second electronic control unit that is configured to determine whether or not overwriting of the stored information is disabled based on the stored information or the production information received by the second communicator when the second communicator receives the stored information or the production information, wherein:
the second communicator sends the disablement instruction to the information processing apparatus when the second electronic control unit determines that disablement is executed, and
the first electronic control unit disables overwriting of the stored information when the communicator receives the disablement instruction.

* * * * *